Figure 1:
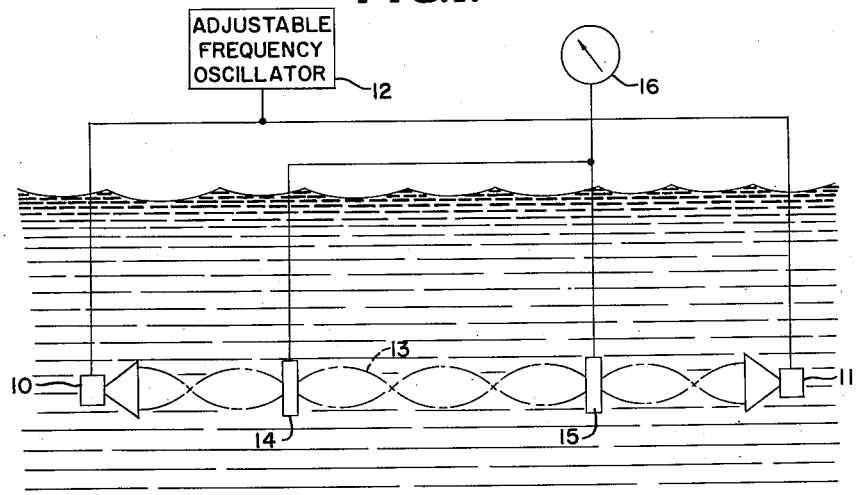

Aug. 14, 1956     B. L. SNAVELY     2,758,663

SOUND VELOCITY MEASURING SYSTEM

Filed March 21, 1955

INVENTOR
B. L. SNAVELY

BY

ATTORNEYS

United States Patent Office 2,758,663
Patented Aug. 14, 1956

2,758,663

SOUND VELOCITY MEASURING SYSTEM

Benjamin L. Snavely, Takoma Park, Md., assignor to the United States of America as represented by the Secretary of the Navy Application March 21, 1955, Serial No. 495,832

3 Claims. (Cl. 181—.5)

(Granted under Title 35, U. S. Code (1952), sec. 266)

The invention described herein may be manufactured and used by or for the Government of the United States of America for governmental purposes without the payment of any royalties thereon or therefor.

This invention relates to a system for accurately determining the velocity of sound in water and more particularly to an underwater sound velocity meter which employs a standing acoustic wave for operation.

In systems of this general character heretofore devised, it has been the usual practice to employ the time required for a high frequency acoustic pulse to traverse a known distance. In certain other types of systems of this character a continuous signal of fixed frequency is employed in an arrangement in which the phase shift introduced by the water path between two electro-acoustic transducers is employed to determine the sound velocity. A third type of system, closely related to the other two types, employs a pair of transducers to measure the phase shift between the two points in the beam of a continuous progressive acoustic wave generated by a third transducer. Such meters for measuring the speed of sound in water and particularly the type known as a sound velocity meter of the pulse type are generally impractical at low frequencies for the reason that they require accurate timing circuits and are in general excessively complicated. Furthermore, in the case of the older phase type sound velocity instruments accuracy is lost if the water moves along the acoustic path. The simpler types of phase shift type velocity meters are highly sensitive to phase shift in the transducers resulting from any cause whatever, such, for example as changes in temperature or pressure. Furthermore, the three transducer type of velocity meter is subject to large inaccuracies because of acoustic reflections from nearby objects.

The present invention possesses all of the advantages of the foregoing devices and eliminates many of the disadvantages. In accordance with a preferred embodiment of the invention a standing acoustic wave is employed in lieu of the progressive wave employed in older sound velocity meters, this standing wave being produced by a pair of identical electro-acoustic transducers facing each other and which are separated by a fixed distance equal to at least several half wave lengths of the frequency in which they operate as will more clearly appear as the description proceeds.

One of the objects of the present invention is the provision of an underwater velocity meter system employing a standing wave produced by a pair of transducers and in which the nodes of the wave have a position essentially independent of phase shifts in the transducers.

Another object is the provision of an underwater sound velocity meter employing a multiplicity of probe hydrophones for locating the position of the nodes in which the hydrophones are so connected that the combined output thereof is sensitive to changes in the distances between the nodes but in the first approximation independent of a uniform translation of the position of the nodes.

Still another object is to produce in combination with a transducer and a reflector, a velocity meter responsive to a standing wave received by a probe transducer in which means are employed for adjusting the frequency of the standing wave so as to cause a node thereof to coincide with the probe.

Figure 2:
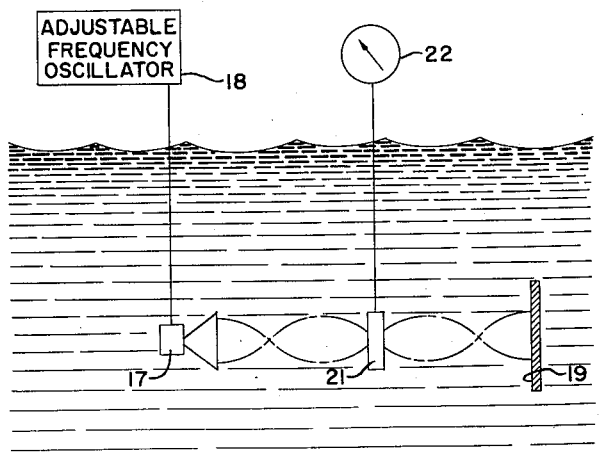

Other objects and many of the attendant advantages of this invention will be readily appreciated as the same becomes better understood by reference to the following detailed description when considered in connection with the accompanying drawings wherein:

Fig. 1 is a schematic view in elevation of the system of the present invention according to a preferred embodiment thereof; and Fig. 2 is a view of the system of the present invention in accordance with an alternative form thereof.

Referring now to Fig. 1 of the drawings for a more complete understanding of the invention, there is shown thereon a system employing a pair of underwater electro-acoustic transducers or loud speakers 10 and 11 which are separated by a fixed distance equal at least to one wave length and produce a standing wave when driven from an adjustable frequency oscillator 12. The standing wave generated by these transducers is indicated by the numeral 13 and will be symmetrically positioned between them if the transducers are identical and are driven in phase as in the instant case. A pair of small probe type receiving transducers 14 and 15 are separated by a fixed distance equal to an integral number of half wave lengths and located preferably on the axis between transducers 10 and 11 in such manner that, for a certain condition of the water medium and a certain frequency setting of the oscillator 12, their positions coincide with nodes in the standing wave, as illustrated. Under these conditions the voltage generated by each of the probes or receiving transducers 14 and 15 will be zero.

For the arrangement shown in Fig. 1 in which there are an odd number of half wave lengths between the probe transducers 14 and 15, the output terminals of said transducers would be connected so that the respective voltages generated within the transducers will mutually aid if the acoustic signals applied to the transducers were in the same phase.

In the event that the transducers 14 and 15 are separated by an even number of half wave lengths, their terminals would be connected so that the respective voltages generated within the transducers would mutually oppose if the acoustic signals applied to the transducers were in the same phase.

Let it be assumed, by way of example, that the velocity of sound in the water is now changed because of a change in temperature or salinity or for some other cause the wave length of the sound will change so that the nodes of the standing wave 13 no longer fall at the positions of the probes 14 and 15. The outputs of these probes combine to produce a deflection of the voltmeter 16. The reading of this voltmeter may be restored to zero either by changing the frequency of the oscillator 12 or by changing the separation of the probes 14 and 15. The change in frequency or the change in the separation of the probes cause an indication of the change in velocity of the sound in the water to be made manifest on meter 16.

If the distance between the probes 14 and 15 correspond to N half wave lengths, the speed of sound is given by the following expression:

$$\text{Speed} = \frac{2 \times \text{frequency} \times \text{distance 14 to 15}}{N}$$

By employing this arrangement errors due to phase shifts in the transducers are reduced. Insofar as transducers 10 and 11 are alike, phase shifts occurring in both will not effect the positions of the nodes in the standing wave. Furthermore since the transducers or probes 14 and 15 are employed only as null detectors, phase shifts introduced by them will be sufficiently minute as to be negligible. Errors resulting from motion of the water are also eliminated to a first order with this arrangement. Whereas flow of water along the axis between the transducers will generally shift the positions of the anodes in the standing wave but to a first order, it will not change the distance between the nodes. The voltages generated by the probes 14 and 15, therefore, by this shift of the nodes, will oppose each other with respect to the deflection of the voltmeter 16.

Whereas in the arrangement of Fig. 1, the two probe hydrophones are interconnected to control a single voltage indicating device 16, it will be understood that considerable variations in the operational details of this system are possible. For example, a separate voltage indicating device might be connected individually to each probe hydrophone and furthermore, if desired, more than two probes may advantageously be employed.

On Fig. 2 is shown an alternative arrangement for a system employing but a single wave producing electro-acoustic transducer and a single probe arranged between the transducer and a sound reflecting surface. This system obviously is considerably simpler than the system of Fig. 1. In accordance with this simplified system acoustic waves produced by the transducer 17 in response to energization by the variable frequency oscillator 18 are reflected back on themselves by the reflecting surface 19 to produce a standing wave pattern. A single probe 21 positioned in the water between the transducer and the reflecting surface is employed to control the voltmeter 22. When the probe is positioned, as shown on Fig. 2, at a node of the standing wave, the voltmeter reading will be zero, the reading of the voltmeter varying as the position of the probe with respect to the node or vice versa is moved.

In Fig. 2 the speaker transducer 17 and the reflector 19 are mutually positioned so that sound from transducer 17 respectively incident on and reflected from reflector 19 produces a standing wave having one or more nodes. The probe type microphone transducer 21 is mounted in selected spatial relationship with respect to the reflector 19 and in a position which, for certain conditions of operation, corresponds to a node. In general the position of this node will depend upon the velocity of the sound wave propagation and its frequency as well as upon the amount of phase shift introduced at reflection. Thus if the frequency of the oscillator 18 is adjusted until the position of the node coincides with the position of the probe 21 as indicated by the null reading of the meter 22 the final frequency will be related to the sound wave velocity. In general, because of phase shifts introduced at reflection, this relationship between frequency and sound velocity propagation will not be as simple as for the symmetrical form of the system described above. A system of the reflecting type, Fig. 2, will generally require calibration under known conditions of velocity in order to establish the specific relationship between sound velocity and frequency for a particular set of conditions. Furthermore, its accuracy may be impaired by effects of extraneous influences, such as changes in temperature and pressure, on the phase shift at the reflecting surface. The advantage of the reflecting type system is its simplicity of construction.

As an alternative arrangement, the probe 21 may be moved to a position with respect to the surface 19 such that it coincides with a node of the standing wave in lieu of adjusting the frequency of the oscillator to achieve this result.

It is possible to depart from the linear arrangement shown in Figs. 1 and 2, for example, transducers 10—11 or the reflecting surface 19 might be in the form of concentric cylinders in which case, since transducers 10 and 11 could not be identical in construction, suitable stability of operation might be achieved by properly showing the relationship between the phase shift characteristics of the two transducers with respect to those factors which may produce such phase shifts.

Whereas the invention has been described with respect to use underwater, it is not so limited as it may be applied with equal facility to ascertain the sound velocities in many different kinds of fluids.

The term "node" as employed herein may be defined as either a pressure or velocity node depending upon the characteristics of the transducer. In general the term "node" means a point in the standing wave where the transducer used as a probe has a minimum output signal.

The expression "separated by a fixed distance equal at least to one wave length" is defined as indicating the approximate magnitude only of the separation. The exact distance of separation of transducers 10 and 11 will depend upon the characteristics of the transducers. A small change in the separation of distance of transducers 10 and 11, in terms of wave length, may appreciably effect the energy in the standing wave. Obviously the separation will be chosen at such value as to give the maximum energy in the standing wave.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United State is:

1. A device for measuring velocities in a water medium which comprises means for transmitting compressional waves through the medium, said means comprising a pair of underwater electro-acoustic transducers facing each other, means for applying an electrical signal of fixed frequency synchronously to both transducers thereby to set up a standing wave within the water, a pair of probe type receiving transducers located between said first named transducers and positioned respectively corresponding to different nodes in said standing wave, and electro-responsive indicating means connected to said probe type transducers and responsive to the voltages generated thereby for indicating the algebraic sum of said voltages whereby the speed of the sound may be made manifest by the formula speed=2×frequency×distance between said receiving transducers divided by the number of half wave lengths therebetween.

2. A velocity measuring device according to claim 1 in which means are employed for varying the frequency of the electrical current applied to said transmitting transducers thereby to effect a change in the reading of said indicating means.

3. A velocity measuring device according to claim 1 in which the distance between said probe type transducers may be varied at will whereby to effect a change in the reading of the indicating means.

References Cited in the file of this patent

UNITED STATES PATENTS 1,881,543    Hartig et al. _____ Oct. 11, 1932

OTHER REFERENCES

Phelps: "A Sound Source for Investigating Microphone Distortion," J. A. S. A., October 1939, pages 219-221.